US008033255B2

(12) United States Patent
Sano et al.

(10) Patent No.: US 8,033,255 B2
(45) Date of Patent: Oct. 11, 2011

(54) ENGINE SYSTEM

(75) Inventors: Tadashi Sano, Ushiku (JP); Shigenori Togashi, Abiko (JP); Takao Ishikawa, Hitachi (JP); Atsushi Shimada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 12/388,954

(22) Filed: Feb. 19, 2009

(65) Prior Publication Data

US 2009/0250018 A1    Oct. 8, 2009

(30) Foreign Application Priority Data

Apr. 4, 2008 (JP) ................... 2008-097692

(51) Int. Cl.
  *F02B 43/08* (2006.01)
(52) U.S. Cl. .......................................... 123/3
(58) Field of Classification Search ......... 123/3; 60/274
  See application file for complete search history.

(56) References Cited

U.S. PATENT DOCUMENTS 5,517,820 A * 5/1996 Kuroda et al. .................. 60/274
7,448,348 B2 * 11/2008 Shinagawa et al. ............ 123/3
7,654,232 B2 * 2/2010 Ishimaru et al. ............... 123/3

FOREIGN PATENT DOCUMENTS

| FR | 2 860 455 A1 | 4/2005 |
| JP | 2005-147124 A | 6/2005 |
| JP | 2005-299499 A | 10/2005 |
| JP | 2008-88922 A | 4/2008 |

OTHER PUBLICATIONS

German Office Action including English translation dated Jan. 18, 2011 (Eight (8) pages).

* cited by examiner

*Primary Examiner* — Michael Cuff
*Assistant Examiner* — Irvin Marrero
(74) *Attorney, Agent, or Firm* — Crowell & Moring LLP

(57) ABSTRACT

An engine system comprising an engine, hydrogen medium capable of repeating chemically storing and discharging hydrogen, an exhaust gas pipe from said engine; and a reactor unit bearing a catalyst;

wherein the hydrogen generated using the heat of the exhaust gas in said reactor unit or the mixture of the hydrogen and said hydrogen medium being supplied to said engine;

wherein said reactor unit includes at least first reactor and second reactor in said exhaust gas pipe and each of said reactors comprises a partition wall disposed between an exhaust gas passage and a hydrogen medium passage; and wherein the thermal resistance of said partition wall of said first reactor positioned on the upstream side is larger than that of said second reactor positioned on the downstream side, and said hydrogen medium is supplied from said first reactor to said second reactor.

7 Claims, 6 Drawing Sheets

ENGINE SYSTEM

CLAIM OF PRIORITY

This application claims priority from Japanese patent application serial No. 2008-097692, filed on Apr. 4, 2008, the content of which is hereby incorporated by reference into this application.

FIELD OF THE INVENTION

The present invention is related to an engine system with a reactor for generating hydrogen from organic compound by the dehydrogenation reaction.

BACKGROUND OF THE INVENTION

As automobiles using gasoline as their fuel exhaust carbon dioxide $CO_2$, hydrogen is focused as a substitute fuel. The hydrogen, however, is an inflammable substance and has high explosive power. Accordingly, its storage requires a lot of caution. To solve the problem, a technique for storing hydrogen as a hydrogenation fuel and if necessary, taking out hydrogen gas by using chemical reaction to supply it to the automobiles are disclosed in Japanese laid open patent publications No. 2005-299499 and 2005-147124.

SUMMARY OF THE INVENTION

The hydrogenation fuel is introduced into a reactor bearing a catalyst to obtain the hydrogen in the invention disclosed in the above references. The dehydrogenation reaction used here is an endothermic reaction requiring heat to be supplied to the reactor and therefore, heat of the engine exhaust gas is generally used.

However, the engine system fails to obtain sufficient amount of the hydrogen required and the heat shortage is compensated by supplying an additional hydrocarbon. Therefore, the amount of the hydrogen generated by the reactor, that is, the shortage of the supplied heat increases the amount of emission of hydrocarbon $CO_2$.

Also, in case the temperature of exhaust gas supplied to the reactor is raised to improve the heat recovery efficiency is raised, it is required to increase the thermal resistance of a wall partitioning a flow passage in the reactor to protect the catalyst deactivated at low temperature. However, its uniform structure of the interior shape of the reactor from the upstream side to the downstream side deteriorates heat transfer characteristic on the downstream side and therefore, the volume of the reactor increases.

To solve the above problems, the present invention provides an engine system producing more hydrogen gas through recovering heat of the exhaust gas from the engine efficiently and proceeding with the dehydrogenation reaction.

The present invention provides an engine system comprising:

an engine;
hydrogen medium capable of repeating chemically storing and discharging hydrogen;
an exhaust gas pipe from said engine; and
a reactor unit bearing a catalyst;
wherein the hydrogen generated using the heat of the exhaust gas in said reactor unit or the mixture of the hydrogen and said hydrogen medium being supplied to said engine;
wherein said reactor unit includes at least first and second reactors in said exhaust gas pipe and each of said reactors comprises a partition wall disposed between an exhaust gas passage and a hydrogen medium passage; and
wherein the thermal resistance of said partition wall of said first reactor positioned on the upstream side is larger than that of said second reactor positioned on the downstream side and said hydrogen medium is supplied to said second reactor from said first reactor.

In addition, the present invention may comprise only one reactor connected to the exhaust gas pipe, and a partition wall between the exhaust gas passage and the hydrogen medium passage in the reactor, and the thermal resistance of the wall partition on the inlet side of exhaust gas of is larger than that of the outlet side.

The present invention is able to provide an engine system using hydrogen gas as a main fuel generated from saturated hydrocarbon by a dehydrogenation reactor and capable of recovering efficiently the exhaust heat from the engine to supply to a dehydrogenation reactor and therefore, reducing the volume of the reactor to improve the productivity of the hydrogen gas.

DESCRIPTION OF THE PREFERRED EMBODIMENTS

One embodiment of the present invention is explained referring to the attached drawings below.

Figure 1:
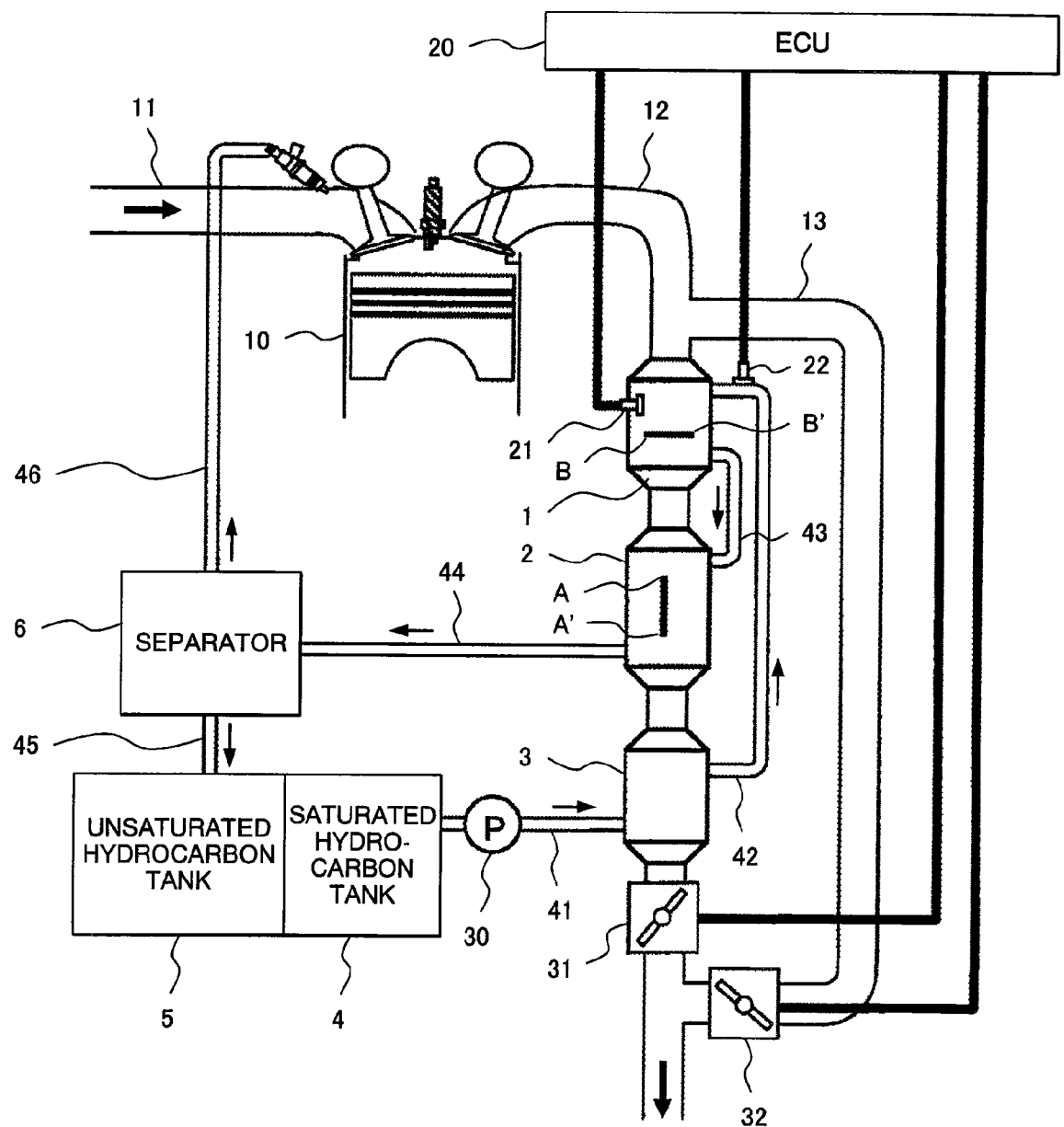
FIG. 1 is a schematic view showing an engine system of an embodiment in accordance with the present invention.

FIG. 1 is a schematic view showing an engine system of the embodiment in accordance with the present invention. The engine system shown in FIG. 1 has an engine 10, which uses hydrogen as fuel. An air suction tube 11 and exhaust pipe 12 are connected to the engine 10 and a first reactor, second reactor and carburetor 3 are disposed in order from the upstream side of the exhaust pipe.

The above mentioned hydrogen medium means all sorts of hydrocarbon fuels, such as gasoline, light oil, kerosene, heavy oil, dekaline, cyclohexane, methylcyclohexane, naphthalene, benzene, toluene, or the like and mixture fuel thereof, and all materials capable of chemically storing and discharging hydrogen, such as hydrogen peroxide, ammonia, nitrogen, oxygen or the like. In particular, medium, which chemically stores hydrogen, is referred to as hydrogenation medium and medium after chemically discharging hydrogen is referred to as dehydrogenation medium.

At first, the hydrogenation medium from a tank 4 as a fuel is pressured by a pump 30 and then injected to a carburetor 3 passing through a pipe 41. In the carburetor 3, a counter current type heat exchanger is constructed and raises the temperature of the liquid fuel to vaporize by the heat of the exhaust gas. The fuel gas from the carburetor 3 is injected from the upstream side of the first reactor 1 passing through pipe 42. The fuel gas is partially decomposed to generate hydrogen gas and dehydrogenation medium through contacting with the catalyst at high temperature state in the first reactor 1.

Next, passing through the pipe 43, the fuel gas and generated gas are supplied from the upstream side of the second reactor 2. In the second reactor 2, the heat is supplied again from the exhaust gas and then most of all unreacted fuel gas is decomposed here.

Figure 2:
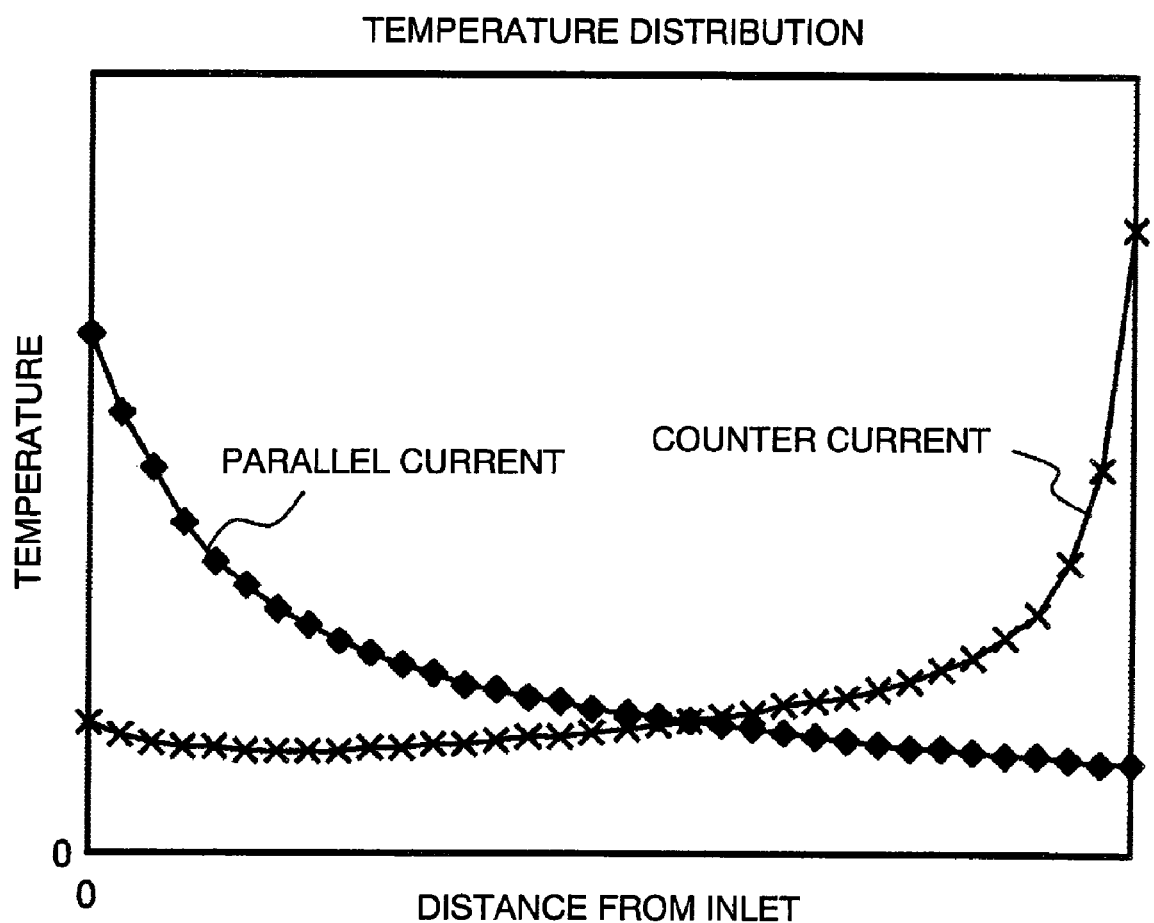
FIG. 2 is a view showing relationship between the distance from the inlet of the reactor and average fuel temperature of the fuel passage of embodiment in accordance with the present invention.

Here, relating to flow direction in the reactor, it is important that the exhaust gas and the fuel flow become same direction in the reactor (hereinafter referred to as parallel current). FIG. 2 shows a view showing the relationship between the distance from the inlet of the reactor and the average temperature value of the fuel passage in the embodiment of the present invention. In the parallel current, the temperature is high just after flowing into the inlet and low around the outlet. To the contrary, in the counter current, the temperature near the outlet becomes high. Therefore, partial heat transferred to the fuel side around outlet is exhausted to outside of the reactor before the fuel is reacted and available heat decreases. Accordingly, in the engine system of the present invention, the flow direction in the reactor is desire to be parallel current.

The mixture gas discharged from the second reactor 2 is separated into unsaturated hydrocarbon and hydrogen by the separator 6 with a cooling device. The separated unsaturated hydrocarbon is stored in a tank 5 through a pipe 45. On the other hand, the separated hydrogen is supplied to an air suction pipe 11 or a cylinder of the engine 10. The hydrogen burnt in the engine 10 becomes high temperature exhaust gas and is supplied to the first reactor 1 as a heat source passing through an exhaust pipe 12 and then exhausted to the atmosphere through the second reactor 2 and carburetor 3.

Also, a by-pass discharge pipe 13 is connected to the discharge pipe 12 between the upstream side of the first reactor 1 and the downstream side of the carburetor 3, and a flow rate limiting valve 32 is provided on the by-pass discharge. Furthermore, a flow rate limiting valve 31 is disposed at the downstream side of the carburetor 3 on the discharge pipe 12.

These two flow rate limiting valve operate by a control signal from an ECU 20. Also, a temperature sensors 21 and 22 are disposed on a pipe 42 respectively and the detected signal is connected with the ECU 20. Here, when the detected temperature becomes higher than a predetermined temperature, or the detected flow rate becomes lower than a predetermined value, the medium in the first reactor is possible to be deactivating state, and the ECU 20 automatically drives the flow rate limiting valve 31 and 32 to control them so as to flow most of all exhaust gas through the by-pass exhaust pipe 13.

The difference between the above-mentioned first reactor 1 and second reactor 2 lies in the materials related to the heat transfer in the reactors. In the respective reactor, the passage of the exhaust gas and the fuel are partitioned with a solid partition wall and the heat transfers through the partition wall. Although acatalyst is bored on the fuel passage side of the partition wall, the maximum temperature of the fuel side is necessary to be suppressed to a temperature lower than the deactivation temperature because the deactivation temperature of the medium is low.

Accordingly, the partition wall of the first reactor 1 positioned on the upstream side of the exhaust gas is suitable to be used with stainless steel, iron, ceramics or the like which has low thermal conductivity to progress the decomposition reaction, suppressing the amount of transferring heat to the fuel passage side and the temperature rising up. The partition wall of the second reactor 2 positioned the downstream side of the exhaust gas is desirable to be used with cupper, aluminum, or the like which has high thermal conductivity to effectively progress the heat transferring below the deactivating temperature.

In addition, the thickness of the partition wall in the first reactor is prefer to be thicker than that of the partition wall in the second reactor 2 to differentiate the heat resistance.

The flow rate limiting valve 31 is not always necessary and therefore, it may be omitted if pressure loss of the exhaust pipe 12 is very larger than that of the by-pass exhaust pipe 13 and the flow rate of the exhaust pipe 12 at full open state of the flow rate limiting valve 32 is negligible small in comparing with that of the by-pass exhaust pipe 13.

The above separator 6 is preferable to be a gas-liquid separation device which cools using cooling device under the boiling point of unsaturated hydrocarbon and uses the specific gravity difference, the surface tension and the like, or a separator using a hydrogen permeable membrane enabling to be penetrated selectively by hydrogen.

Furthermore, the outlet of the by-pass exhaust gas pipe 13 is connected again with the exhaust gas pipe 12. As shown in FIG. 1, there is no necessary to connect with the exhaust gas pipe 12, if positioning a cleaning device on the downstream side of the by-pass exhaust gas pipe 13.

FIG. 1 shows an engine system uses only hydrogen in the fuel discharged from the reactor, it is however, able to apply an engine system with mixture gas of hydrogen and dehydrogenation medium as it is without limiting to the above structure. In addition, after separating the mixture, it is possible to supply an engine system with the dehydrogenation medium at the arbitrary rate.

Figure 3:
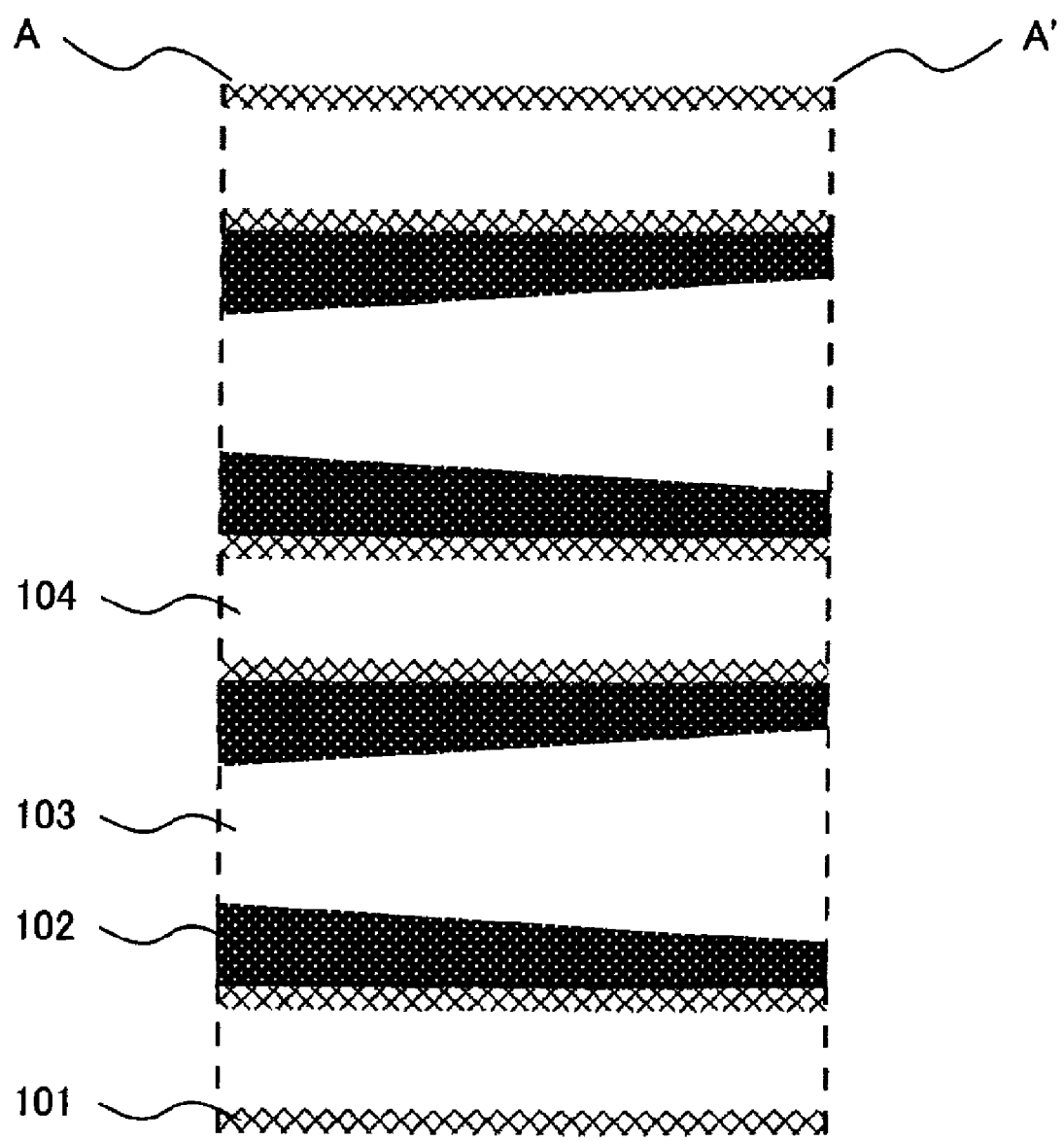
FIG. 3 is a section view showing the reactor of the embodiment in accordance with the present invention.

FIG. 3 shows a sectional view of the reactor of the embodiment in accordance with the present invention. This sectional view is a section along a line A-A in FIG. 1 and an example of partially enlarged section parallel to the flow of the reactor. While a pair of the reactors of the engine system is shown in FIG. 1, only one reactor is available.

In the reactor, the exhaust gas passage 103 and fuel passage 104 are laminated alternately. Although FIG. 3 only shows three layers, more layers are available. The medium 101 is bored in the fuel passage 104 in the reactor and the fuel produces hydrogen by contacting with a medium 101.

According to the reactor of the present invention, a partition wall 102 is arranged between the exhaust gas passage 103 and the fuel passage 104 in the reactor, and the partition wall is thick at the inlet of the exhaust gas pipe (side A). Therefore, the heat resistance of the partition wall is large around the inlet and the heat transfer from the high temperature in-flow exhaust gas is suppressed to decrease the temperature rise of the fuel. On the other hand, the thickness of the partition wall 102 is thin around the outlet side (side B) and heat resistance is small and the heat is easy to be transferred and sufficiently heat transferring from low temperature exhaust gas becomes possible.

Also, although the thickness of the partition wall changes smoothly or continuously in FIG. 3, stepwise change is available for obtaining same effects.

Figure 5:
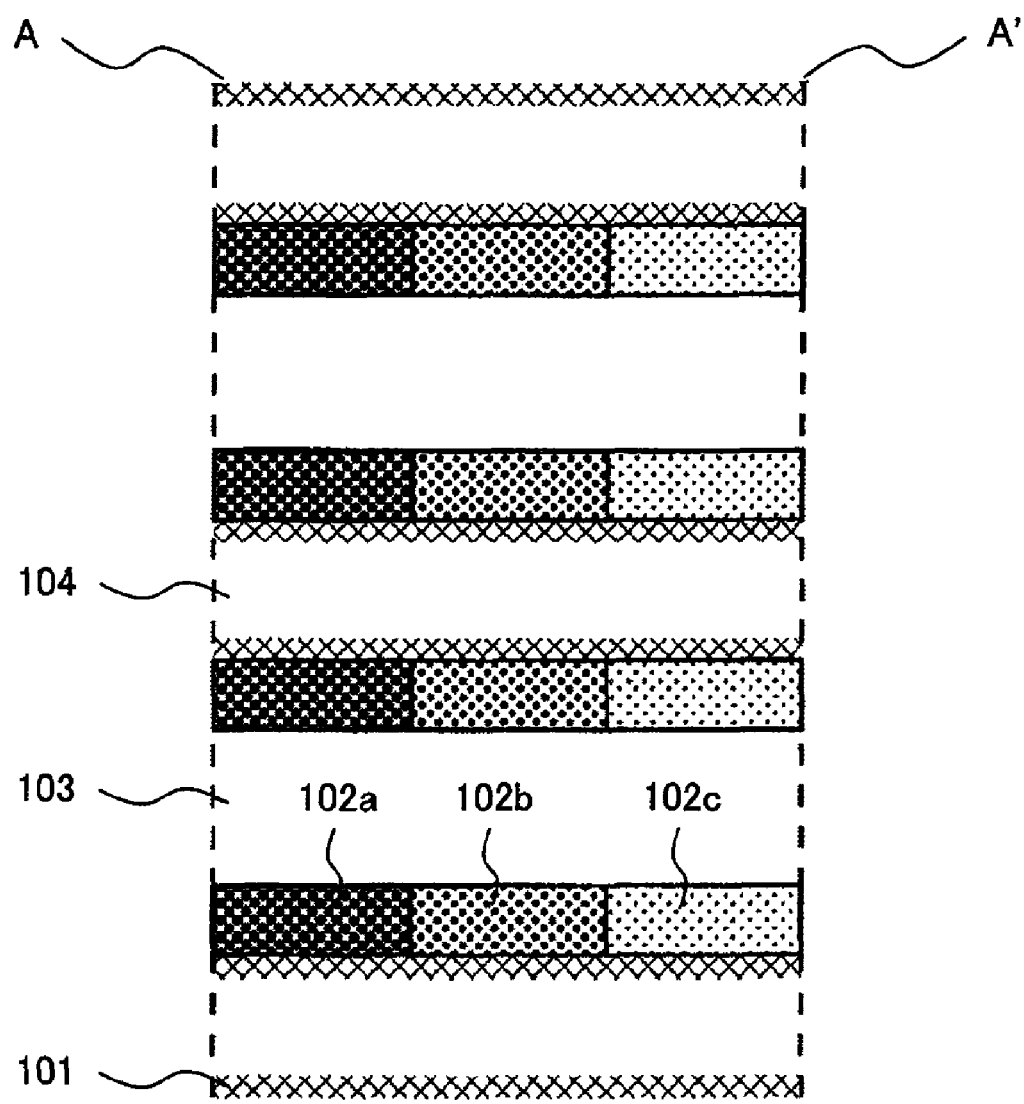
FIG. 5 is a another sectional view showing a reactor of the embodiment in accordance the present invention.

Also, the section of the reactor of the present invention is sufficient to be the shape shown in FIG. 5. Therefore, the reactor having a cylindrical laminated pipe laminated in the direction of its circumference or rectangular shaped pipe of laminated flat plates is available.

Figure 4:
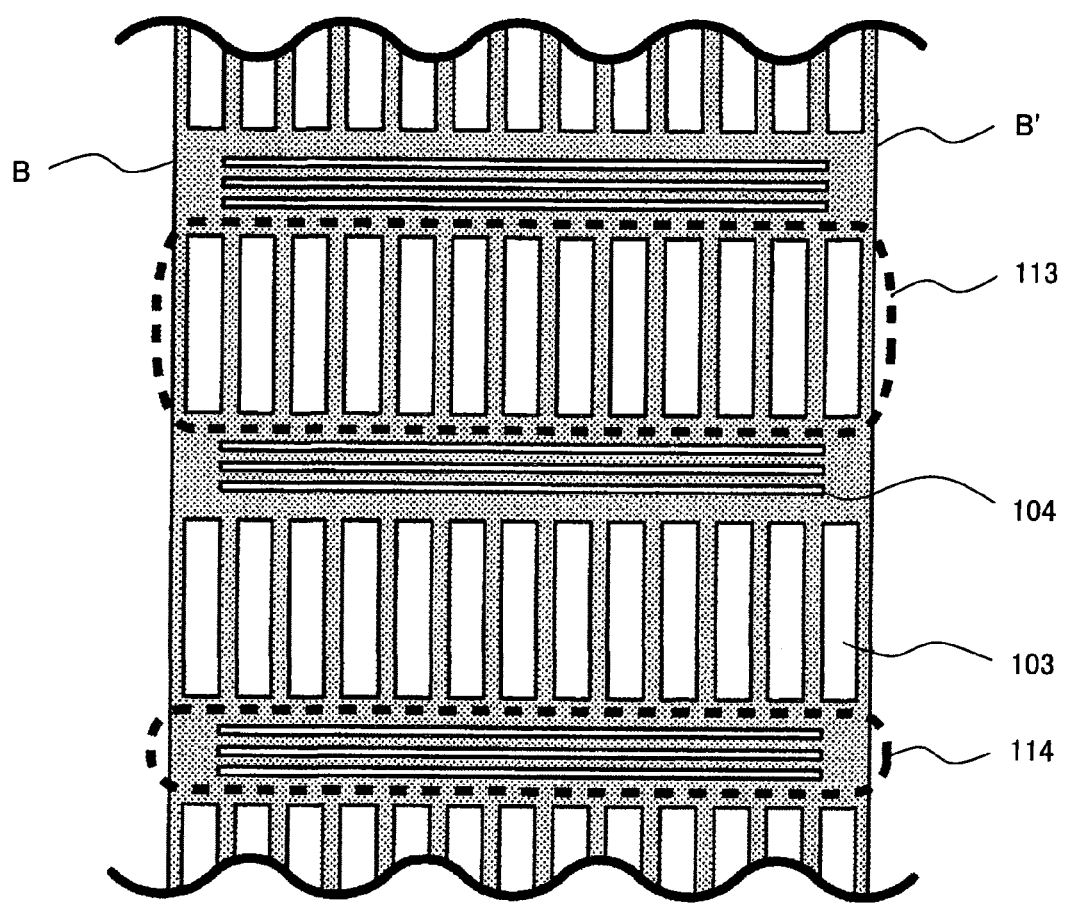
FIG. 4 is a section view showing the reactor of the embodiment in accordance with the invention.

FIG. 4 is a sectional view showing a reactor of an embodiment in accordance with the present invention. This section view is a section of the reactor along the line B-B' as shown in FIG. 1 and shows a partially enlarged sectional view perpendicular to the liquid flow direction. Therefore, in the real engine system, reactors more than the reactors shown in FIG. 1 are laminated in right and left or up and down directions.

In the reactor of the present invention, the exhaust gas passage 113 is composed of a collected tube which a plurality of fuel passages 103 of the reactor are arranged in parallel and the fuel passage 114 is composed of a collecting tube which a plurality of the fuel passages 104 are arranged in the reactor. In addition, the exhaust gas flow passage 113 and fuel flow passage 104 are alternately laminated. A catalyst is bored in the fuel passage 104 of the reactor and the fuel generates hydrogen in contact with the medium.

The section of the exhaust gas passage 103 in the reactor is elongated section in the direction of heat transferring to the fuel. Section of the exhaust gas passage 104 in the reactor is perpendicular and elongated shape to the heat transferring direction from the exhaust gas. This structure is suitable to transfer heat from the exhaust gas having large amount flow rate to the fuel having low flow rate as large heat flux.

In addition, ratio of a short side and long side of the section of the exhaust gas passage 103 in the reactor is selected from 1:2 to 1:50 to accomplish the object of the present invention, and if the rate from 1:5 to 1:20 is able to realize the present invention with higher efficiency.

Additionally, the fuel passage portion 114 may be one flow passage to carry out the present invention, however it is higher efficiency to use a collection pipe collecting a plurality of the fuel passages in the reactor.

Also, the section of the reactor of the present invention is sufficient to be the shape shown in FIG. 4. Therefore, relating to the laminating method, a cylindrical laminated pipe laminated in the direction of circumference of cylindrical pipe or rectangular shaped pipe of laminated flat plates is available.

In addition, with respect to the fuel passage portion 114 and exhaust gas passage 113, their surface area per unit volume are desirable to be large. Accordingly, while a collecting pipe of laminated passages with high aspect ratio section is used in FIG. 4, open type porous material such as sponge is available as each flow passage portion.

Furthermore, the present invention is applicable to all cases without limiting the number of the reactor in the engine system to solve the problems.

The above sectional structures of the reactors shown in FIGS. 3 and 4 are able to accomplish same effects through realizing with only one or combination of them.

FIG. 5 is another sectional view showing the reactor of the embodiment in accordance with the present invention. This sectional view is a section along the line A-A' in FIG. 1 and an example of partially enlarged sectional view parallel to the flow direction of the reactor.

The above-mentioned section structure as shown in FIG. 3, shows an example when the thickness of the partition wall is changed. On the other hand, a sectional view shown in FIG. 5 shows an example when the partition wall is constructed with material having different thermal conductivity. Although the present invention is explained showing two reactors, but only one reactor is also available.

Both of the exhaust gas passage 103 and the fuel flow passage 104 of the reactor are laminated alternately. In FIG. 5, although tree passages are laminated, the number of the lamination is not limited. A catalyst 101 is bored in fuel passage 104 and the fuel generates hydrogen by contacting with the catalyst 101.

In the reactor of the present invention, a partition wall produced with a material having different thermal conductivity is disposed between an exhaust gas passage 103 and a fuel passage 104. In FIG. 5, the partition wall uses three kinds of materials and a partition wall 102a positioned at its inlet side (side A) of the exhaust gas uses lowest thermal conductivity material. Then a partition wall 102b is uses a little higher thermal heat conductivity material along to the downstream side and a partition wall 102c positioned on the most downstream side (side A') uses high thermal conductivity material.

This change assures large heat resistance of the partition wall around the inlet of the exhaust gas and heat transfer from the exhaust gas flow with high temperature is limited to suppress temperature rise of the fuel. On the other hand, as the heat resistance is low at the out let side of the exhaust gas and the heat transfer becomes easy, sufficiently heat transferring from the exhaust gas with lowered temperature is performed.

Also, the section of the reactor of the present invention is sufficient to be the shape shown in FIG. 5. Therefore, cylindrical laminated pipe laminated in the direction of circumference of cylindrical pipe or rectangular shaped pipe of laminated flat plates is available.

Also, according to the above embodiment, although the partition wall is contacted with different kinds of adjoining materials, there is no need to joint it at all surfaces. It is capable of holding its shape by fixing to a catalyst. The heat recovery efficient is improved through performing heat exchange with the parallel current in the reactor.

Figure 6:
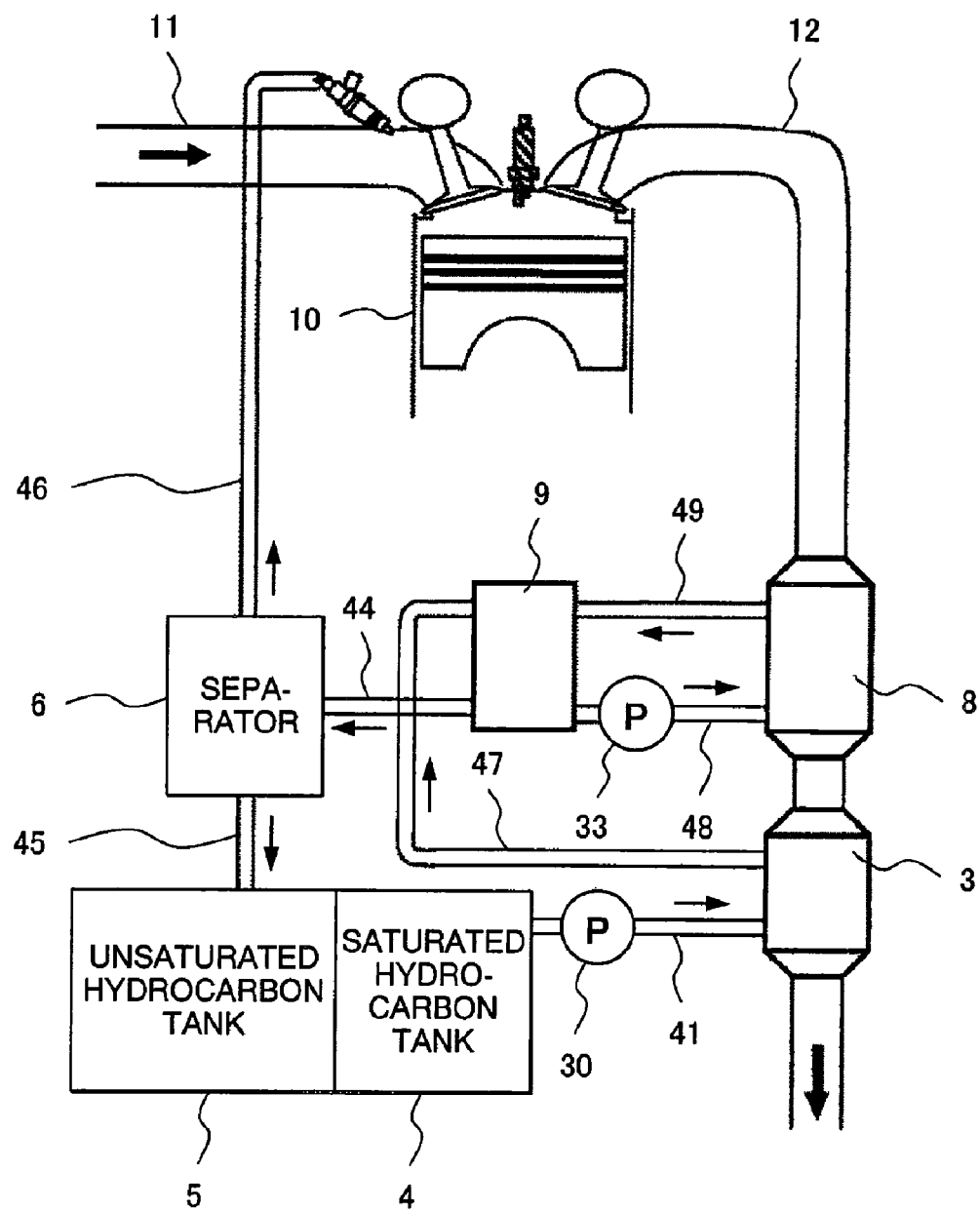
FIG. 6 is a schematic view showing another engine system of an embodiment in accordance with the present invention.

FIG. 6 is another schematic view showing the engine system of the embodiment in accordance with the present invention. At first, a heat exchanger 8 transfers heat from the exhaust gas to the liquid heat medium with more than 200° C. The heated heat medium is supplied to the reactor through the pipe 49. In the reactor, the heat exchange is carried out under counter current and the heat is transferred to the fuel from the heat medium to generate hydrogen. The heat medium, which lowered its temperature through the heat exchange, is compressed by a pump 33 and again flows into the heat exchanger B.

On the other hand, fuel after vaporized by the carburetor 3 flows into the reactor 9 through the pipe 47 so as to be parallel current. The fuel receives heat here from the heat medium generates hydrogen and flows into the separator 6 through a pipe 44.

Accordingly, this engine system is able to use liquid heat medium with the large specific heat as a heat source of the reactor and as a result, the temperature distribution in the reactor 9 is suppressed at low value and the deactivation of the medium is also prevented.

As the present invention enables to hermetically seal the thermal medium pipe, heat exchanger, reactor and the like, any materials which becomes fluid state over 200° C. at pressured condition or negative pressure condition and a heat medium with phase change such as a heat pipe are sufficiently available as the heat medium of the present invention.

What is claimed is:
1. An engine system comprising:
an engine;
hydrogen medium capable of repeating chemically storing and discharging hydrogen;
an exhaust gas pipe from said engine; and
a reactor unit bearing a catalyst;
wherein the hydrogen generated using the heat of the exhaust gas in said reactor unit or the mixture of the hydrogen and said hydrogen medium being supplied to said engine;
wherein said reactor unit includes at least first and second reactors in said exhaust gas pipe and each of said reactors comprises a partition wall disposed between an exhaust gas passage and a hydrogen medium passage; and wherein the thermal resistance of said partition wall of said first reactor positioned on the upstream side is larger than that of said second reactor positioned on the downstream side and said hydrogen medium is supplied to said second reactor from said first reactor.

2. An engine system comprising:

an engine;

hydrogen medium capable of repeating chemically storing and discharging hydrogen;

an exhaust gas pipe from said engine; and a reactor bearing a catalyst;

wherein the hydrogen generated using the heat of exhaust gas in said reactor unit or the mixture of the hydrogen and said hydrogen medium being supplied to said engine;

wherein said reactor arranged in said exhaust gas pipe includes a partition wall disposed between an exhaust gas passage and a hydrogen medium passage in said reactor, and the thermal resistance of said partition wall on the inlet side of said exhaust gas is larger than that of the outlet side of said exhaust gas pipe.

3. The engine system according to claim 2, further comprising a by-pass exhaust gas pipe branched from said exhaust gas pipe on the upstream side of said reactor and a flow rate limiting valve disposed downstream than the middle point of said by-pass exhaust gas pipe.

4. The engine system according to claim 1, further comprising a carburetor disposed on the downstream side of said second reactor and performing heat exchange between the hydrogen medium and exhaust gas, wherein the hydrogen medium is supplied in order of said carburetor, said first reactor, and said second reactor, and the heat exchange at least in one reactor is parallel current.

5. The engine system according to claim 2, wherein said partition wall of said reactor is structured with materials at least two kinds of materials, and thermal conductivity of the material of said partition wall on the out side is higher than that of the inlet side of said exhaust gas.

6. An engine system comprising:

an engine;

hydrogen medium capable of repeating chemically storing and discharging hydrogen;

an exhaust gas pipe from said engine; and a reactor bearing a catalyst;

wherein the hydrogen generated using the heat of exhaust gas in said reactor unit or the mixture of the hydrogen and said hydrogen medium being supplied to said engine;

wherein said reactor is provided in said exhaust gas pipe, and a partition wall disposed between an exhaust gas passage and a hydrogen medium passage in said reactor, and the thickness of said partition wall on the inlet side of said exhaust gas pipe is larger than that of outlet side of said exhaust gas pipe.

7. The engine system according to claim 1, further comprising a by-pass exhaust gas pipe branched from said exhaust gas pipe on the upstream side of said reactor and a flow rate limiting valve disposed downstream than the middle point of said by-pass exhaust gas pipe.

* * * * *